(12) United States Patent
Nebel

(10) Patent No.: US 6,233,089 B1
(45) Date of Patent: May 15, 2001

(54) PROCESS AND APPARATUS FOR GENERATING AT LEAST THREE LIGHT BUNDLES OF DIFFERENT WAVELENGTH, ESPECIALLY FOR DISPLAYING COLOR IMAGES

(75) Inventor: Achim Nebel, Kaiserslautern (DE)

(73) Assignee: LDT GmbH & Co. Laser-Display-Technologie KG, Gera (DE)

( * ) Notice: Subject to any disclaimer, the term of this patent is extended or adjusted under 35 U.S.C. 154(b) by 0 days.

(21) Appl. No.: 09/180,726

(22) PCT Filed: Mar. 24, 1998

(86) PCT No.: PCT/EP98/01722

§ 371 Date: Nov. 13, 1998

§ 102(e) Date: Nov. 13, 1998

(87) PCT Pub. No.: WO98/44387

PCT Pub. Date: Oct. 8, 1998

(30) Foreign Application Priority Data

Apr. 1, 1997 (DE) .............................. 197 13 433

(51) Int. Cl.$^7$ ........................................................ G02F 1/39
(52) U.S. Cl. ............................ 359/330; 359/326; 359/328
(58) Field of Search .................................. 359/326–332; 385/122; 372/21, 22, 23

(56) References Cited

U.S. PATENT DOCUMENTS

| | | | | |
|---|---|---|---|---|
| 5,144,630 | * | 9/1992 | Lin ........................................ | 372/22 |
| 5,233,462 | * | 8/1993 | Wong ................................... | 359/330 |
| 5,400,173 | * | 3/1995 | Komine ................................ | 359/330 |
| 5,640,405 | * | 6/1997 | Wallace et al. ........................ | 372/21 |
| 5,740,190 | * | 4/1998 | Moulton ................................ | 372/23 |
| 5,787,102 | * | 7/1998 | Alexander et al. ................... | 372/22 |
| 5,894,489 | * | 4/1999 | Halldorsson et al. ................ | 372/23 |

FOREIGN PATENT DOCUMENTS 195 04 047   7/1996 (DE) .
WO96/25008 * 8/1996 (WO) .

OTHER PUBLICATIONS

XP–002070520 / Applied Optics, Sep. 1996, pp. 5336–5339 "Visible pulses of 100 fs and $\mu$J from an upconverted parametric generator" R. Danielius, et al.

XP–000629257 / Optics Communications, Jan. 1996, pp. 121–128 "Highly effcient generation of blue–orang femtosecond pulses from intracavity–frequency–mixed optical parametric oscillator" A. Shirakawa, et al.

XP–002070522 / SPIE vol. 2379, Feb. 1995, pp. 282–290 "Frequency upconversion experiments in an optical parametric oscillator" E.C. Cheung, et al.

* cited by examiner

Primary Examiner—John D. Lee
(74) Attorney, Agent, or Firm—Reed Smith LLP

(57) ABSTRACT

In a process and an apparatus for generating at least three light bundles of different wavelength for displaying color images, one of these light bundles having a longest wavelength and another of the light bundles having a shortest wavelength, which light bundles are obtained by an OPO and further nonlinear optical component elements from a signal beam and/or idler beam of the OPO and/or a primary light bundle, from which a beam exciting the OPO is also derived, it is provided that at least a partial light bundle is separated from the primary light bundle for exciting the OPO, in that the light bundle with the longest wavelength and the light bundle with the shortest wavelength are obtained from the signal beam and/or idler beam of the OPO by way of frequency multiplication and/or frequency mixing with another partial light bundle of the primary light bundle by excluding components of light bundles other than the generated light bundles with the shortest and longest wavelengths for image display.

12 Claims, 6 Drawing Sheets

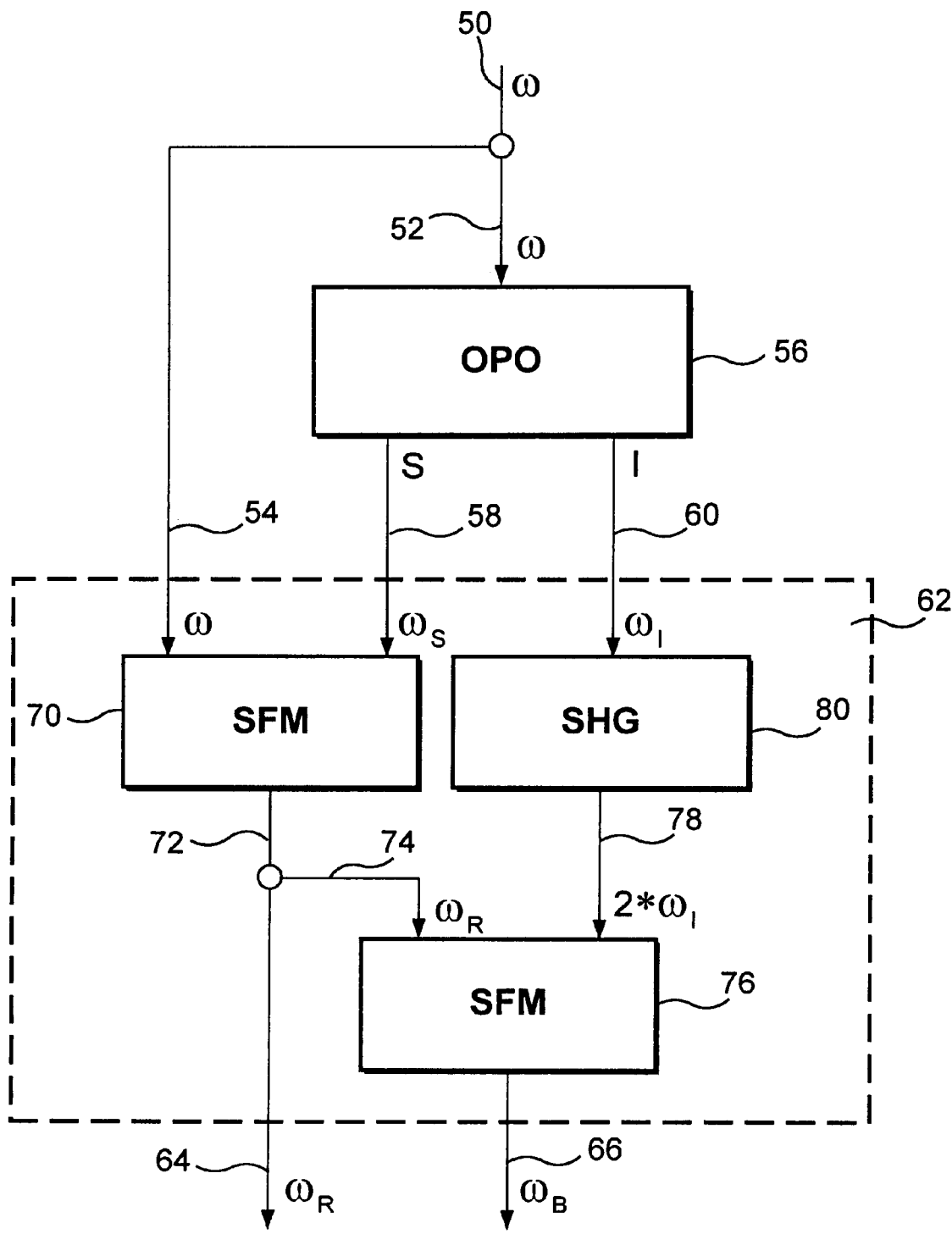
F I G. 3

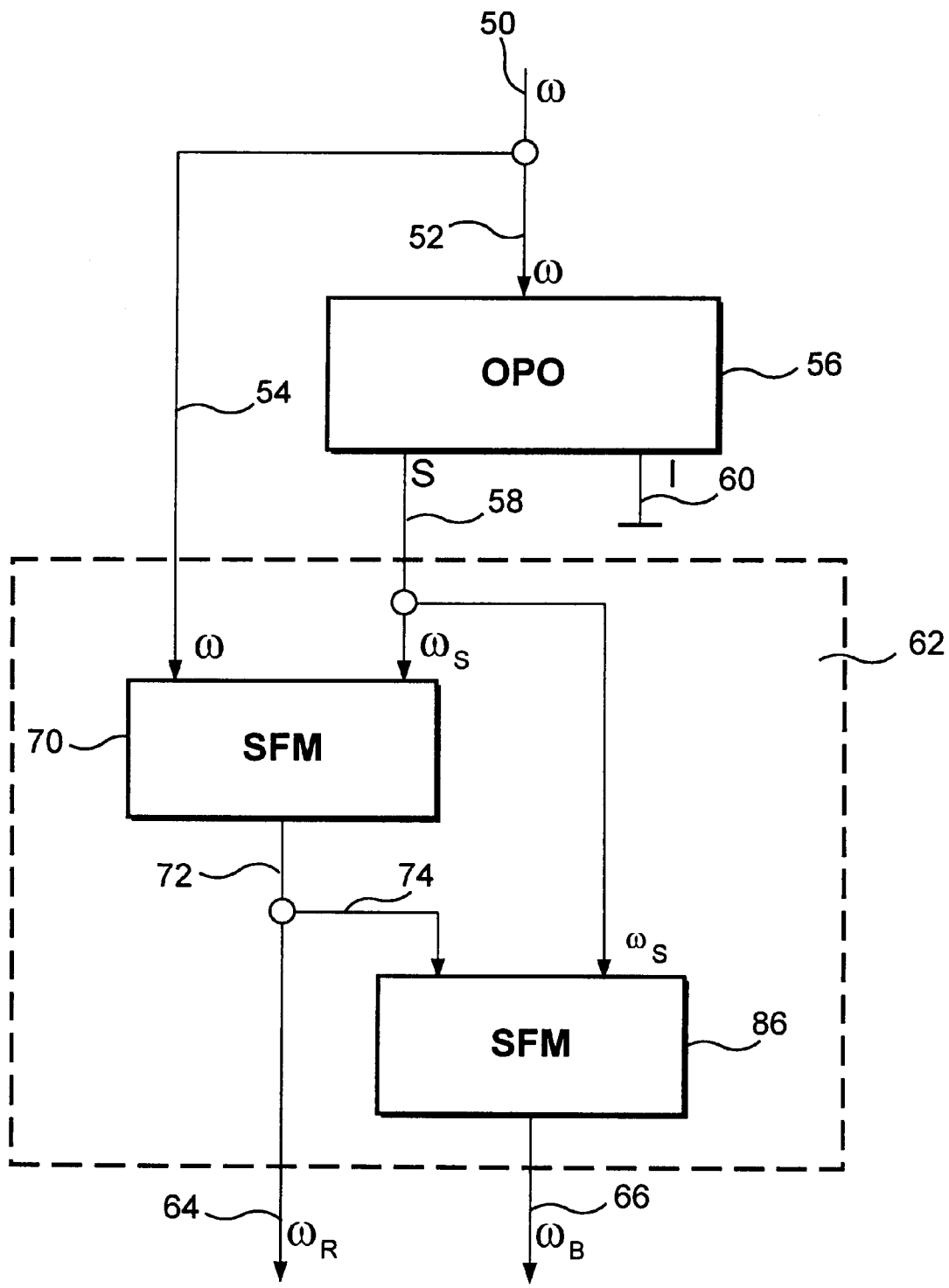
F I G. 5

PROCESS AND APPARATUS FOR GENERATING AT LEAST THREE LIGHT BUNDLES OF DIFFERENT WAVELENGTH, ESPECIALLY FOR DISPLAYING COLOR IMAGES

BACKGROUND OF THE INVENTION a) Field of the Invention

The invention is directed to a process for generating at least three light bundles of different wavelength, especially for displaying color images, one of these light bundles having a longest wavelength and another of the light bundles having a shortest wavelength, which light bundles are obtained in the process with an OPO and further nonlinear optical component elements, such as devices for generating higher harmonics and/or sum frequency mixers and/or difference frequency mixers, from a signal beam and/or idler beam of the OPO and/or from a primary light bundle, from which a beam exciting the OPO is also derived.

b) Description of the Related Art

The invention is further directed to an apparatus for generating at least three light bundles of different wavelength, especially for displaying color images, one of these light bundles having a longest wavelength and another of the light bundles having a shortest wavelength, with a laser for generating a primary light bundle, with an OPO from which a signal beam and/or an idler beam can be taken after excitation by means of a partial light bundle of the primary light bundle, and with a device having nonlinear optical elements, wherein a further light bundle, the idler beam and/or the signal beam, is introduced into this device, and wherein the light bundle with the longest wavelength and the light bundle with the shortest wavelength can be coupled out of this device.

The expression "partial light bundle" which is employed hereinafter is understood herein to mean not only a light bundle which is split off by means of a beam splitter, but also a light bundle which is formed in and exits from nonlinear crystals as an unconverted component of the exciting beam.

Devices of the type mentioned above are known, for example, from DE 195 04 047 C1 and from WO 96/08116. Although this prior art is exclusively concerned with the generation of red, green and blue beams for use in a color video system, this technique can also be used in printing. In this connection, the wavelengths are not necessarily selected according to the color sensitivity of the human eye because, in such applications, the color selection of the laser is also substantially related to the sensitivity of the film to be exposed or the surface to be imprinted. Further, this technique is also not limited to three colors, that is, to three light bundles of different wavelength, since, at the present time, color pictures of high quality, for example art prints, are usually produced with more than three colors, in four-color or even six-color printing.

While the technique is also applicable in other areas such as the printing industry, reference is had herein essentially to laser video engineering as is known, for example, from DE 43 06 797 C1, in which only three laser beams with the colors red, green and blue are normally used. In an application of this kind, the light bundle with the shortest wavelength is blue and the light bundle with the longest wavelength is red.

In the present state of the art, difficulties are encountered particularly in generating the required shortest-wave blue light bundle using economical lasers with sufficiently high efficiency.

In DE 195 04 047 C1 and WO 96108116, it is suggested, in order to reduce expenditure for laser video projection, to obtain all of the light bundles with the different wavelengths for the colors red, green and blue from an individual infrared laser with the help of nonlinear optical elements. An optical parametric oscillator, hereinafter referred to as OPO, as is known, for example, from DE 42 19 169 A1, is used, above all, for this purpose. In an OPO of this type, an exciting light bundle is introduced into a nonlinear optical crystal. As a result of the optical nonlinearity, two additional beams of different frequency, the signal beam and the idler beam, can be obtained in addition to the exciting beam, depending on the orientation of the crystal and/or the temperature and/or the wavelength of the exciting beam.

According to the prior art indicated above, the signal beam and idler beam are then mixed together to form three light bundles with wavelengths suitable for laser projection by means of frequency summing or by forming higher harmonics via additional nonlinear optical elements. In particular, a partial light bundle of the green laser beam is used in addition for this purpose in order to effectively generate the blue light bundle and the red light bundle, that is, the light bundle with the shortest wavelength as well as the light bundle with the longest wavelength.

With regard to the special technique of the OPO, frequency mixing and the generation of higher harmonics, reference is had in particular to the prior art mentioned above and to the references cited therein.

WO 96/08116, above all, is useful for realizing this technique. Various possibilities are given therein for generating three light bundles of different wavelength with OPOs. This reference also includes a table for material selection for the OPO crystals, the wavelengths made possible by means of these materials for the signal beam and idler beam and physical parameters to be taken into consideration, required temperature regulating accuracy, operating temperature, and crystal cut or orientation and the like data which allow the person skilled in the art to build corresponding OPOs with the required regulating devices and heating means.

Examination of these tables shows, however, that extensive compromises must be made for a laser system for color display that is usable in practice. Either a high temperature accuracy is required, the crystals must sometimes also be operated at temperatures higher than room temperature, or the indicated possibilities are dependent on the use of light bundles with wavelengths in the far infrared range or in the ultraviolet range. In the far infrared range or UV range, only a slight transparency is to be expected in many of the indicated crystals; that is, the crystals partially absorb the laser energy, which adds to the difficulty of phase matching and accordingly of temperature stabilization for the required regulating accuracy and also results in a reduced intensity for the light bundles that are usable for video projection, i.e., lowers efficiency. As experiments have shown, the absorption can even cause an unforeseeable destruction of the crystals.

When crystals are used at an operating temperature above room temperature, an initial warmup period is necessary after switching on so that a sufficiently high stability for proper operation of a video system is possible only after a long period of time. Although this startup time could be reduced by means of higher heat output and improved regulation, this would required an increase in electronic apparatus.

OBJECT AND SUMMARY OF THE INVENTION

Therefore, it is the primary object of the invention to find an alternative solution to the arrangements for the process from the prior art which has the advantages of a system for generating a plurality of light bundles of different wavelength with the help of OPOs and additional nonlinear optical elements, but which allows a substantially more economical solution that is usable in practice and enables a high efficiency for light bundles for color image display with high utilization of energy.

Proceeding from the process mentioned above, this object is met in that at least a first partial light bundle is separated from the primary light bundle for exciting the OPO, in that the light bundle with the longest wavelength and the light bundle with the shortest wavelength are obtained from the signal beam and/or idler beam of the OPO by way of frequency multiplication and/or frequency mixing with another partial light bundle of the primary light bundle by excluding components of light bundles other than the generated light bundles with the shortest and longest wavelengths for image display.

When carried over to the example with three light bundles for video projection, this means that the invention, in contrast to the solutions in the prior art for generating the red light bundle and the blue light bundles, does not make use of frequency mixing with a green light bundle. Instead, the light bundle used for mixing with the signal beam and/or idler beam has the same frequency as the infrared light bundle which excites the OPO. Because of this, it is possible, as will be shown hereinafter with the aid of examples and calculations, to select the lowest frequency occurring during the generation of the light bundles for color display in such a way that it occurs in the near infrared region and, in particular, at a wavelength of less than 2,000 nm.

In the invention, this frequency of the partial beam used for mixing is substantially determined by the light bundles with the greatest and smallest wavelengths, that is, with the respective extrema, which is why a frequency mixing with the signal beam and idler beam or with a light bundle obtained therefrom by frequency doubling makes it possible to select the light bundles used in the process for generating the light bundles for a color display substantially in the visible range down to the near infrared range, if required. This provides substantial advantages for the material selection of the nonlinear optical crystals because, in this case, there is required only a narrowly defined spectral region in which such crystals are generally transparent. For purposes of a solution that is usable in practice, this means that there is a greater selection of suitable crystals with low absorption losses. Accordingly, in particular, a heating of the crystal due to absorption and phase mismatching can also be reduced, which also results in a lower expenditure on regulation among other things.

Surprisingly, it has been shown that unnecessary UV components are also substantially reduced in practical embodiment examples of the solution according to the invention. In addition to the higher efficiency which is accordingly made possible for the light bundle with the shortest wavelength, that is, in the laser video system for the blue beam, another advantage consists in that the useful life of the optical elements within an apparatus for carrying out this process is extended because the possibility of damage to these elements through UV radiation is reduced. Because of this, the maintenance requirement for such image generating systems is lowered.

A further advantage results in that the green beam, that is, a light bundle for color display other than the light bundles with the shortest and longest wavelengths is not used at all to generate the latter. This provides a substantially greater stability for the output of the laser beams for color display than in the embodiment examples according to the prior art in which the green beam was used for frequency mixing. In the latter, an instability of the green beam would directly affect the blue beam and red beam, so that, in principal, the required expenditure on regulation would be much higher than in the solution according to the invention. In this way, also, the invention is substantially more economical.

Moreover, in a preferred further development of the process, at least one light bundle other than one of the light bundles with the shortest wavelength and with the longest wavelength is obtained by frequency multiplication from the primary light bundle or from a portion thereof for color image display.

Based on these measures, this has the advantage that as many of the at least three light bundles as possible are generated by an individual laser for color image display. The advantage is especially clear in the case of three light bundles as in the above-mentioned laser video projection system, since all three light bundles are then obtained more economically because of this further development.

In particular, the green light bundle in video projection systems of this kind with the primary colors red, green and blue are generated by frequency multiplication. Accordingly, the light bundle for green, with wavelengths in the order of magnitude of 500 mn, determines the wavelength for the primary light bundle with a doubling of frequency to about 1,000 nm or with a tripling of the frequency to approximately 1,500 nm. This means that the primary light bundle has, in any case, at least wavelengths smaller than 2,000 nm without excessive frequency multiplication and accordingly correspondingly high efficiencies, so that, also on the basis of this further development, a narrow spectral region is determined for an apparatus for carrying out the process, which narrow spectral region brings about the advantages mentioned above pertaining to the choice of crystals with a small spectral range for transparency.

In a further advantageous development of the invention, the primary light bundle is conducted through a nonlinear optical crystal for frequency multiplication, wherein a light bundle with the frequency of the primary light bundle for exciting the OPO and the light bundle with twice the frequency of the other light bundle for image generation are taken from this crystal.

This further development relates to a particularly favorable arrangement for obtaining the green light bundle which is given by way of example. First, this further development for the primary light bundle is restricted to half of the frequency of the green light bundle, that is, to a wavelength of the primary light bundle of approximately 1,000 nm, which leads in particular to an especially advantageous narrowing of the spectral region for the operation of the OPO. Second, the primary light bundle for exciting the OPO is likewise taken from the crystal for frequency doubling; therefore, additional splitter mirrors for splitting the primary light bundle into different partial light bundles can be dispensed with. Expenditure is also advantageously reduced in this way. Further, a maximum component of the light output of the primary light bundle is accordingly utilized for generating at least three light bundles so that a high efficiency is given for color image display.

In a preferred further development of the invention, the light bundles with the longest and shortest wavelengths are generated, without mixing with the idler beam, exclusively from the signal beam of the OPO and a partial light bundle of the primary beam bundle or higher harmonics of the latter.

In an OPO, the sum of the frequencies of the signal beam and the idler beam is equal to the frequency of the exciting beam due to the energy conservation for photons. Therefore, when an idler beam is in the far infrared region in this process, the signal beam lies in the near infrared region, or even in the visible range. Accordingly, only a small spectral region is required for the subsequent frequency mixing for generating the light bundles with the shortest and longest wavelengths, which is especially favorable for the selection of the nonlinear optical crystals and the advantages brought about in this way which have already been considered.

This further development is thus particularly advantageous when an idler beam is in the far infrared region, since this idler beam need not be used for color generation For the apparatus mentioned in the introduction, the stated object is met in that the additional light bundle as well as the light bundle provided for excitation of the OPO are partial light bundles of the primary light bundle, and the light bundle with the shortest wavelength as well as the light bundle with the longest wavelength can be generated in the device having nonlinear optical elements exclusively from the additional light bundle, the signal beam, the idler beam and/or higher harmonics of the latter without resorting to light bundles other than the light bundles with the longest and the shortest wavelengths for displaying images.

In this apparatus, the process is carried out by means of a device containing nonlinear optical elements, as is known in a similar form from the prior art. The constructions for such arrangements shown in the prior art likewise illustrate, due to their simplicity, that an apparatus for the generation of at least three light bundles for color image display which is usable in practice is possible by means of the invention.

The aforementioned advantages of the further developments of the invention with respect to the process can also be realized in the following further developments of the apparatus, in which there is provided a nonlinear optical crystal into which another partial light bundle of the primary light bundle or the primary light bundle itself enters, and from which the light occurring as a result of the nonlinear optical behavior of this crystal is introduced into a wavelength-selective filter by which a light bundle for color image display other than one of the light bundles with the shortest wavelength or with the longest wavelength can be filtered out;

further, another light bundle can be taken from the nonlinear optical crystal by means of this filter or another filter, which light bundle is introduced into the device having the nonlinear optical elements as a partial light bundle for exciting the OPO and/or as a partial light bundle for generating the light bundles with the shortest or longest wavelength;

and/or the OPO has a crystal by which an infrared idler beam can be generated, and exclusively the signal beam of the OPO and a partial light bundle of the primary light bundle are introduced into the device having the nonlinear optical elements.

In another preferred further development of the invention, it is provided that the laser emits light with a wavelength of between 1,020 nm and 1,080 nm. This determination of the wavelength of the laser enables a particularly narrow spectral region for the nonlinear optical crystals used in the apparatus, which brings about the aforementioned advantages with respect to material selection and, in particular, with respect to the transparency of the crystal and the resulting savings on regulating apparatus. It has further been shown that all three colors for a video projection system for displaying all of the possible colors in different video standards can be generated by means of a laser of this wavelength in a suitable and particularly economical manner.

The following further developments of the invention primarily concern economical constructions for the device having nonlinear optical elements which is used in the apparatus.

In a first advantageous further development of this type, a first sum frequency mixer is provided within the device comprising nonlinear optical elements, at least one partial light bundle of the signal beam of the OPO and a partial light bundle of the primary light bundle being introduced into this sum frequency mixer, whereupon the light bundle with the longest wavelength is taken from this sum frequency mixer.

In this way, the light bundle with the longest wavelength can be generated economically, with high efficiency and in a simple manner by means of a nonlinear optical crystal.

In another preferred further development of the invention, a second sum frequency mixer is provided in the device having nonlinear optical elements, a partial light bundle of the light bundle with the longest wavelength and another partial light bundle obtained from the signal light beam and/or idler beam or higher harmonics thereof being introduced into this second sum frequency mixer, wherein the light bundle with the shortest wavelength can be taken from the output side of this sum frequency mixer.

In this case also, substantially only one individual sum frequency mixer is needed with respect to the light bundle with the shortest wavelength using the example of blue. However, there are two possibilities in this connection: either a partial light bundle of the signal light bundle or its higher harmonics is introduced into the second sum frequency mixer. The first possibility is more economical due to the lower number of optical elements.

Although an additional nonlinear crystal is used in the second possibility for generating the higher harmonics, expenditure can still be reduced when the efficiency is increased by means of this arrangement.

The following two further developments make advantageous use of the latter possibility, wherein the frequency-doubled idler beam and the frequency-doubled signal beam are used for obtaining the light bundle with the shortest wavelength.

In the first of the two further developments of the invention, a frequency doubler is used into which at least one partial light bundle of the idler beam enters, and the frequency-doubled light bundle obtained by means of the frequency doubler is introduced into the second sum frequency mixer. The light bundle, or a portion thereof, with the longest wavelength is also fed to the sum frequency mixer.

In the second further development of the invention which is advantageous in this respect, a frequency doubler is provided for frequency-doubling the signal beam and a second sum frequency mixer is provided into which the signal beam doubled by the frequency doubler and a partial light bundle of the primary light bundle are introduced, and the light bundle with the shortest wavelength is taken from this second sum frequency mixer.

As was clear from the preceding further developments of the invention, these further developments work, among others, with the division of the primary light bundle, signal beam or light bundle with the longest wavelength, the color red in the example of the video system, into partial light bundles. A beam splitting of this kind can be carried out, for example, by means of partially transmitting mirrors or also in that a determined partial light bundle is coupled out of the nonlinear optical elements after spectral dispersion at a suitable angle. For the latter example, reference is had to the partial light bundle emerging from the OPO with the frequency of the primary light bundle, which partial light bundle can likewise be used for mixing in the device having the nonlinear optical elements as a partial light bundle of the primary light bundle. In particular, the respective light bundles can be divided by suitable dichroitic mirrors as they exit together from the optical nonlinear crystals.

Whichever way the splitting of the light bundles is carried out, the efficiency of the apparatus can be economically increased with the correct dimensioning of the component factors or proportion factors. In this regard, it is provided in a preferable further development of the invention that when splitting into partial light bundles, the respective proportion factor is determined for a maximum output for displaying white when mixing the three light bundles for displaying color images. The laser output for color display is optimally configured in this way.

In this further development, the proportion factors are obtained on the basis of determining extrema in a manner familiar to the person skilled in the art. For this purpose, an equation can be formulated for any construction of the apparatus, according to the selected nonlinear optical elements, for the maximum output for displaying the color white when mixing the at least three light bundles, which equation contains the proportion factors as parameters. After deriving the equation according to these parameters and zero-setting, a system of equations results in a known manner, which system is then solved for optimum parameters in order to determine extrema.

In addition to an analytical procedure of the kind mentioned above, the use of commercially available optimizing programs on a computer is further recommended for this optimization of the proportion factors. The resulting proportion factors for splitting into light bundles results, by way of this dimensioning of the apparatus, in light bundles of especially high useful efficiency for image displaying operation.

The process according to the invention and the apparatus according to the invention are described more fully in the following by way of example with reference to the drawing.

BRIEF DESCRIPTION OF THE DRAWINGS

In the drawings:

FIG. 3 to FIG. 5 show various embodiment examples for generating light bundles with the shortest and longest wavelength for a laser video system.

DESCRIPTION OF THE PREFERRED EMBODIMENTS

Figure 1:
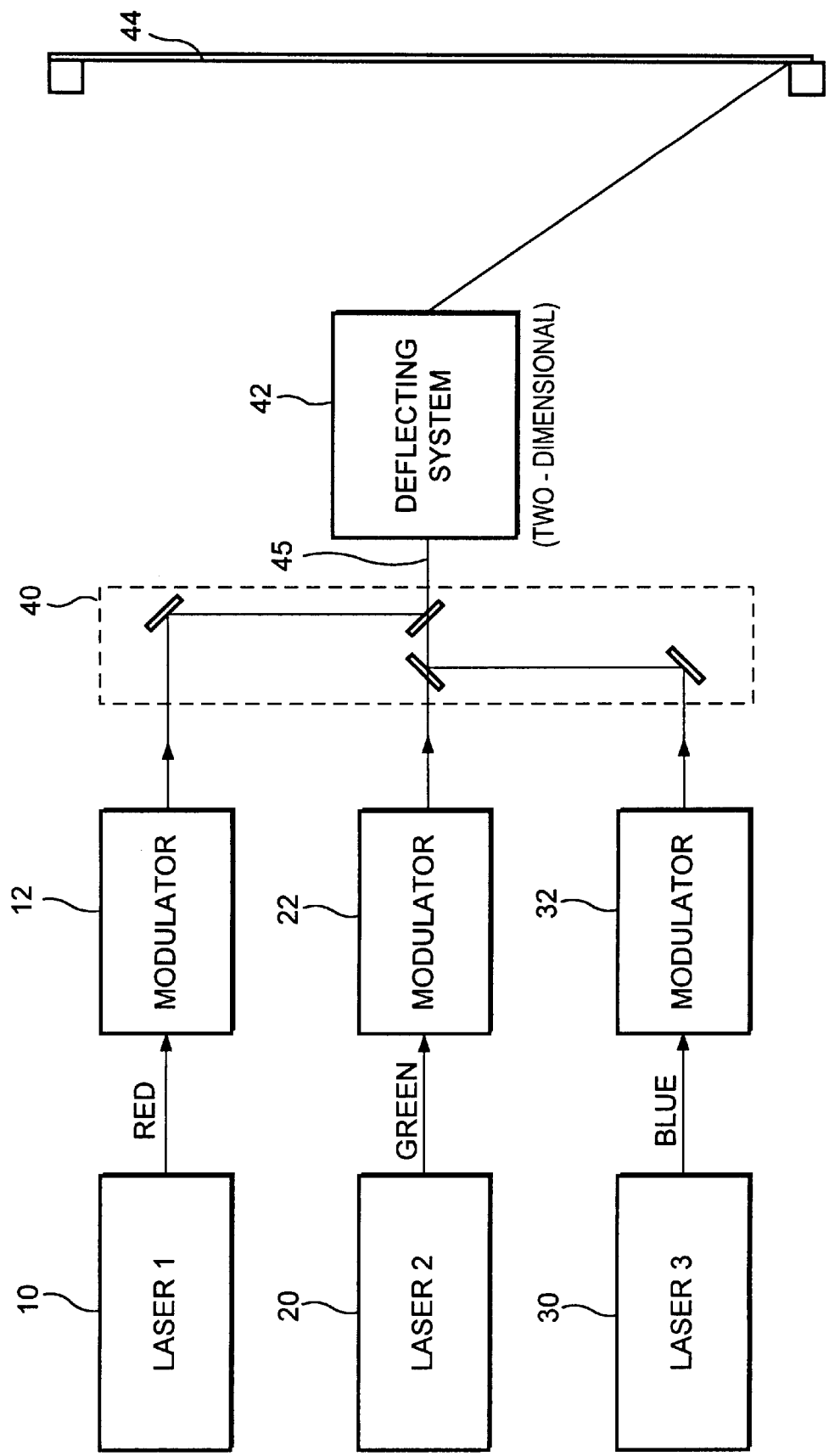
FIG. 1 is a schematic view of an apparatus for color display.

Although, the invention can be used in the printing industry, as was already mentioned, the following description primarily makes use of the example of a video device in which only three light bundles are used. These light bundles are generally selected with wavelengths for red, green and blue. The blue light bundle is the light bundle with the shortest wavelength and the red light bundle is the light bundle with the longest wavelength. The green light bundle is an additional, different bundle of the three light bundles for color image display. This further light bundle is generally used to generate the red light bundle and the blue light bundle in the prior art. In contrast to the prior art, this is not required in the invention as will be made clearer in the following.

First, the principle of a video device will be illustrated with reference to FIG. 1. To display monochrome partial images, three lasers 10, 20, 30 are used, conventionally with laser wavelengths which correspond to the colors red, green and blue on the spectral curve in the CIE chart. These laser beams which are emitted by the lasers 10, 20, 30 are amplitude-modulated by modulators 12, 22, 32 with the respective color intensity which is suitable for the image point to be illuminated on a screen to display this color. The three laser beams are subsequently unified in a mirror system or prism system 40 to form a single collinear parallel light bundle 45 which is projected by a deflecting device 42 onto a screen 44.

In video systems of this kind, difficulties are encountered primarily in generating the blue laser beam with sufficiently high efficiency without resorting to very expensive lasers. In the apparatus shown in the following FIGS. 2 to 5, the laser sources 10 and 30 can be replaced in order to generate their light bundles with sufficiently high intensity. Further, it is also possible to replace laser 20 by means of the same device when a green light bundle is derived from the utilized laser beams as is shown by way of example in the embodiment example of FIG. 6.

Figure 2:
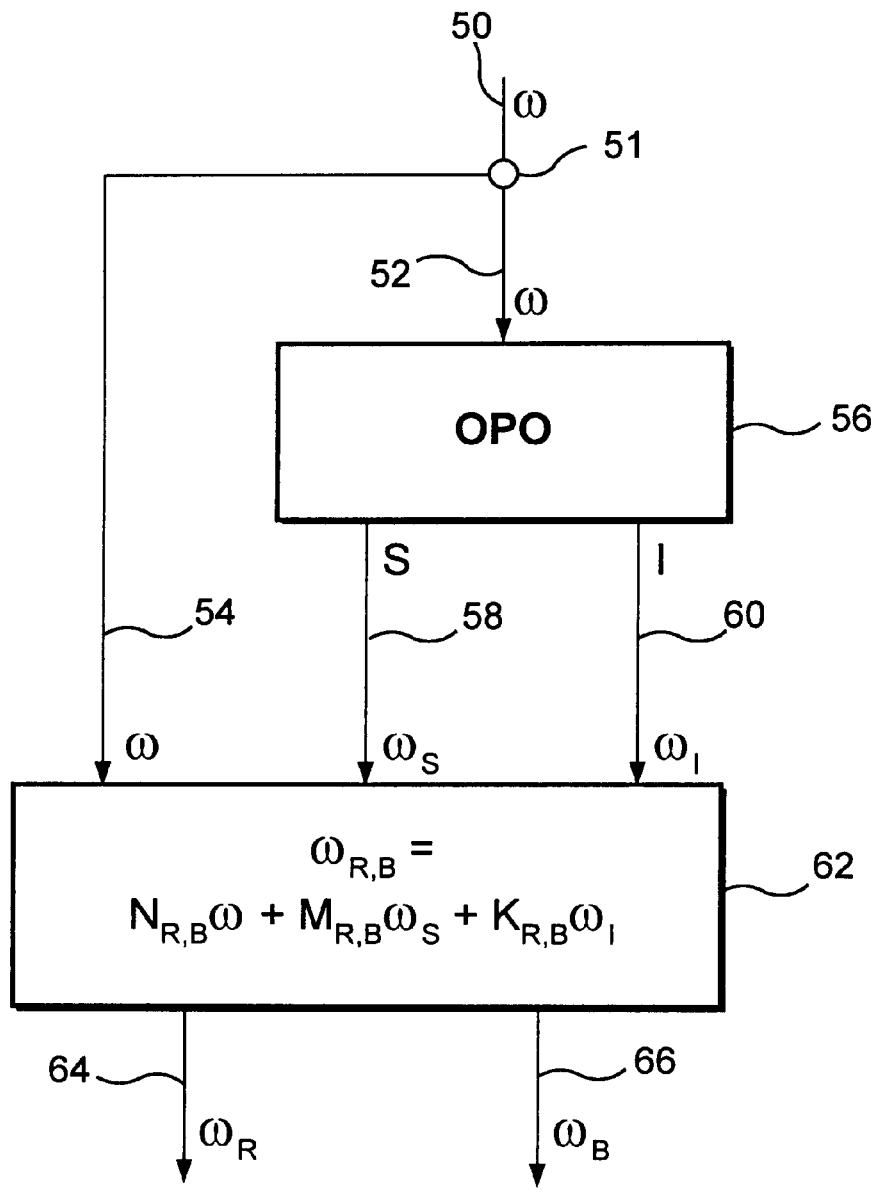
FIG. 2 is a schematic view of an embodiment example for a fuller explanation of the invention.

FIG. 2 shows the principle by which the apparatuses according to FIGS. 3 to 6 operate in a schematic view. First, a primary light bundle 50 is taken from a laser 46 shown in FIG. 6 and is divided into two partial light bundles 52 and 54 at point 51, for example, by means of partially transmitting mirrors. The partial light bundle 52 is then fed to an optical parametric oscillator 56, hereinafter "OPO". An OPO contains a nonlinear optical crystal as its essential element. Due to the nonlinearity and given an appropriate orientation of the crystal, a signal beam 58 and an idler beam 60 can be taken from it. Due to the conservation of photon energy, an equation results whereby the sum of the frequency $\omega_S$ of the signal beam with the frequency $\omega_I$ of the idler beam gives the frequency $\omega$ of the exciting partial light bundle 52.

According to FIG. 2, the partial light bundle 54, the signal beam 58 and the idler beam 60 are fed to another device 62 having nonlinear optical elements, from which device 62 the light bundle 64 with the shortest wavelength and the light bundle 66 with the longest wavelength, that is, red and blue, respectively, are removed.

Further, a partial beam of the light bundle 52 is not converted into different frequencies in the crystal of the OPO 56. This means that another partial light bundle with frequency $\omega$ can also be removed from the OPO 56. This partial light beam can likewise be used as a light bundle 54, wherein the efficiency of the conversion of the primary light bundle 50 with frequency $\omega$ in the red and blue light bundles 64 and 66, respectively, is increased.

Figure 4:
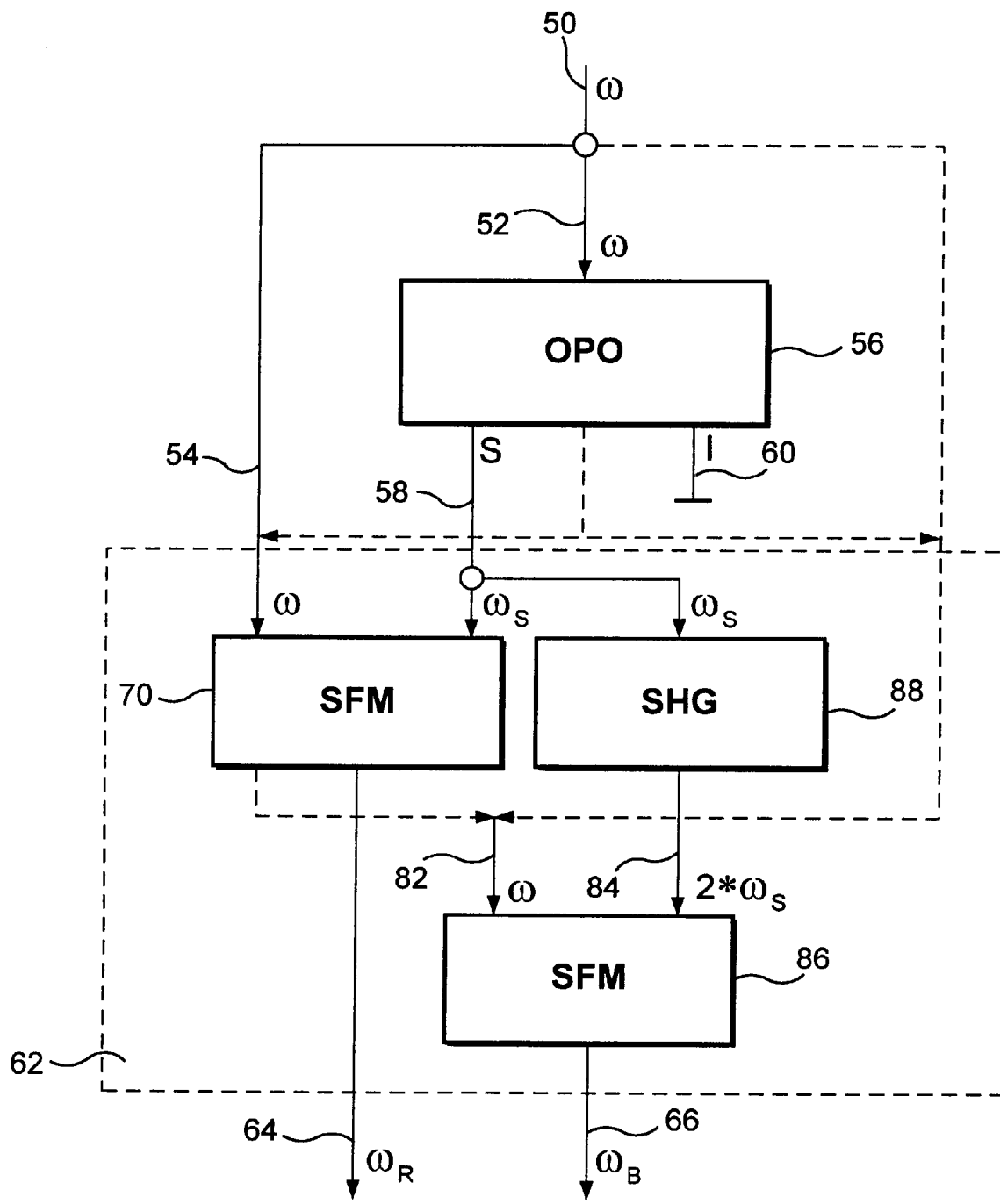

The manner of construction of the device 62 having the nonlinear optical elements is shown in more detail in FIGS. 3 to 5. However, what is important in this respect is that this device has sum frequency mixers, difference frequency mixers and arrangements for generating higher harmonics. For these optical elements, the following general equations are obtained for the frequencies of the emerging light bundles 64 and 66:

$$\omega_R = N_R \cdot \omega + M_R \cdot \omega_S + K_R \cdot \omega_I$$

$$\omega_B = N_B \cdot \omega + M_B \cdot \omega_S + K_B \cdot \omega_I,$$

where the coefficients $N_R$, $N_B$, $M_R$, $M_B$, $K_R$, $K_B$ are whole numbers. When using summing frequency mixers exclusively, these sum frequency mixers are always positive. However, if differential-frequency mixing is also provided in the device 62, the coefficients can be negative.

The equations for $\omega_R$ and $\omega_B$ indicated above show that the frequency $\omega$ in an arrangement according to FIG. 2 can be determined in virtually any desired manner by a suitable selection of the coefficients $N_R$, $N_B$, $M_R$, $M_B$, $K_R$, $K_B$. However, the freedom of choice is additionally limited as a result of the above-mentioned relationship resulting from the energy conservation:

$$\omega_I = \omega - \omega_S.$$

By replacing this equation in the above equation system, four independent coefficients are given:

$$\omega_S = (N_R + K_R) \cdot \omega + (M_R - K_R) \cdot \omega_S$$

$$\omega_B = (N_B + K_B) \cdot \omega + (M_B - K_B) \cdot \omega_S.$$

Assuming that the highest output of such a system can be achieved when $\omega_S$ is approximately ½ $\omega$, this gives the following equations which can be used for estimating the coefficients:

$$\omega_R \approx \left(N_R + \frac{1}{2}M_R + \frac{1}{2}K_R\right) \cdot \omega$$

$$\omega_B \approx \left(N_B + \frac{1}{2}M_B + \frac{1}{2}K_B\right) \cdot \omega$$

If it is required that the nonlinear crystals that are used should be as transparent as possible at $\omega$ as well as at $\omega_R$ and $\omega_B$, then the value $\omega$ is selected in such a way that a wavelength of less than 2,000 nm is given, so that there are only frequencies in the near infrared region as far as possible. For the wavelength of the blue beam at approximately 400 nm and for the red beam at approximately 600 nm, the following requirement should be selected for the most advantageous selection of crystals:

$$\left|N_R + \frac{1}{2}M_R + \frac{1}{2}K_R\right| \leq 2$$

$$\left|N_B + \frac{1}{2}M_B + \frac{1}{2}K_B\right| \leq 4$$

The resulting limitation for the coefficients is extremely advantageous. The value of the coefficients is in a direct relationship with the quantity of the nonlinear optical elements in the device 62. Because of the indicated requirement, it is expected that the device 62 can always be realized with less than four nonlinear optical elements, which will be made clearer especially by the embodiment examples in FIGS. 3 to 5.

Therefore, these estimations show that in the embodiment example of FIG. 2 using exclusively frequencies occurring in a narrow spectral region, in the near infrared to the blue region, only a minimum quantity of nonlinear optical crystals and accordingly also a small quantity of beam splitters and mirrors are required. The apparatus according to FIG. 2 is therefore very economical.

Further, because of the limitation of the spectral range between 2,000 nm and 400 nm considered above, it is possible to use nonlinear optical elements, for example, such as those known from WO 96/08116, which can even be operated at room temperature in an economical manner with respect to regulation. Further, the embodiment example of FIG. 2 can be configured with particularly high efficiency since crystals of this kind in the provided narrow spectral region with sufficiently high transparency are known.

Some embodiment examples are shown in FIGS. 3 to 5 to more fully describe the device 62.

In all of these examples, an individual sum frequency mixer 70 is provided for generating the red light bundle 64. The red light bundle 64 is generated by frequency summing from the partial light bundle 54 and the signal light bundle 58 or from a partial light bundle thereof (FIGS. 3, 4 and 5).

For this purpose, only an individual optical crystal is necessary, resulting in a correspondingly economical construction. Therefore, the coefficients $N_R = 1$ and $M_R = 1$ are selected for these examples.

In the embodiment example of FIG. 3, the light bundle 72 exiting from the sum frequency mixer (SFM) 70 is divided into the red light bundle 64 and another red partial light bundle 74 which is in turn fed to another sum frequency mixer 76 which is used to generate the blue light bundle 66.

For the required mixing, a light bundle 78 with twice the frequency of the idler beam 60 which is obtained by means of a frequency doubler 80 (SHG: second harmonic generator) is fed to the sum frequency mixer. Thus, in this example, the equation $N_B = 1$, $M_B = 1$ and $K_B = 2$ is used.

In this example, in particular, optical elements are economized in that the coefficients $N_B = 1$ and $M_B = 1$ are realized by branching the partial light bundle 74 from the light bundle 72 taken from the sum frequency mixer 70. For the highest possible efficiency of this division in the video projection device according to FIG. 1, the proportion factor for splitting the light bundle 72 into the light bundles 74 and 64 and the splitting of the primary light bundle 50 into the light bundles 52 and 54 should be optimized. It has turned out that the most advantageous optimization is achieved when the divisions are configured in such a way that the highest possible white luminous density is achieved for the color image display. The most advantageous splitting factor can be determined either by experimentation or by means of the calculations described above.

Depending on the frequency $\omega$, the idler frequency in the embodiment example of FIG. 3 could lie in a spectral range in which the transparency of the crystal of the OPO 56 or of the frequency doubler 80 is insufficient. Excessive absorption would then reduce the efficiency or unnecessarily limit the crystal selection for the OPO 56 or frequency doubler 80.

In the following, two examples are shown in which the above risk is absent, since in this case the idler beam 60 for generating the light bundles 64 and 66 is not used; that is, the device 62 is restricted to the coefficients $K_R = K_B = 0$. This limitation has advantageous consequences above all for the selection of the nonlinear optical crystals, both in the OPO 56 itself and in the device 62.

In the embodiment example of FIG. 4, the red light bundle is removed directly from the sum frequency mixer 70 and the blue light bundle is obtained through another partial light bundle 82 of the primary light bundle 50 and a frequency-doubled partial light bundle of the signal beam 58, the light bundle 84 via a second sum frequency mixer 86. In so doing, a partial light bundle is branched off from the signal beam 58 for blue and the light bundle 84 is accordingly generated via a frequency doubler 88. Accordingly, FIG. 4 shows an example for $N_B = 1$ and $M_B = 2$.

The partial light bundle 82 can be taken off by means of splitting the primary light bundle 50, the partial light bundle 54 or also, as was shown for the partial light bundle 54, from the sum frequency mixer 70 or, further, from the OPO 56. Moreover, the partial light bundle supplied to the frequency doubler 88 can also be removed from the sum frequency mixer 70, that is, its unconverted component, by filtering, which above all increases efficiency because the photons not converted by the crystal in the sum frequency mixer 70 during the frequency summing are also utilized to increase the light intensity of the light bundle 66.

FIG. 5 shows another example in which it is illustrated that only the signal beam 58, and not the idler beam 60, is used for forming the light bundles 64 and 66. As distinct from the example in FIG. 4, the device 62 contains only two nonlinear optical elements, namely the sum frequency mixer 70, for one, and a second sum frequency mixer 86. In contrast to FIG. 4, a partial beam of the signal beam 58 and a partial beam of the light bundle 72 generated by the sum frequency mixer 70 are fed to the second sum frequency mixer 86. In this case also, $N_B=1$, $M_B=2$ as in the example shown in FIG. 4. Other component elements such as the frequency doubler 80 can be dispensed with in this example since the partial light bundle 74 is taken from the sum frequency mixer 70 as a partial light bundle and the partial light bundle 74 already contains the sum frequency $\omega+\omega_S$.

Reference is had to the foregoing remarks in FIG. 3 with regard to the splitting of the light bundle 72 into light bundles 74 and 64. In particular, the optical splitting is determined by the requirement for a high white luminous output in a video projection system according to FIG. 1.

Figure 6:
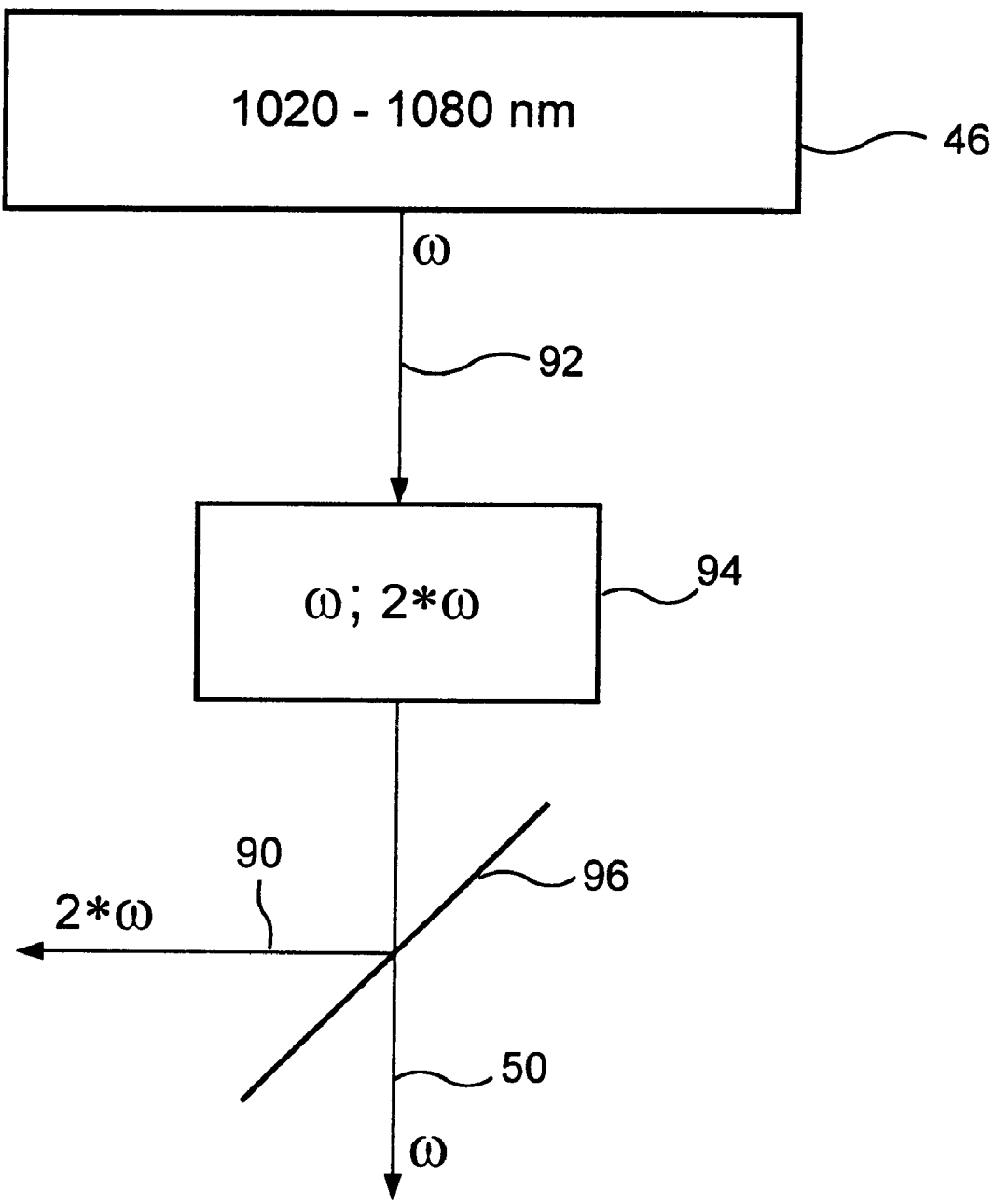
FIG. 6 shows an example for an advantageous splitting of the primary light bundle for an apparatus which can be used in a video projection system.

It is further shown by way of example in FIG. 6 how a green light bundle 90 can also be generated simultaneously with the primary light bundle 50 used for excitation of the OPO. For this purpose, a laser beam 92 generated by the laser 46 is guided through a nonlinear optical crystal 94. Due to the optical nonlinearity of the crystal, upper harmonics occur with frequency $2\omega$ as well as the fundamental wave with frequency $\omega$. By means of a filter 96, for example, a dichroitic mirror, a light bundle 90 with doubled frequency and the fundamental wave as primary light bundle 50 for excitation of the OPO 56 can be derived; this light bundle 90 is used further to generate the signal beam 58 and idler beam 60.

The light bundle 90 is selected with respect to frequency in such a way that the green light bundle can be generated with it. With green wavelengths between 510 nm and 540 nm, a wavelength of 1020 nm to 1080 nm results for the exciting laser, so that the laser can be, for example, a mode-coupled Nd:YLF laser in view of this frequency range.

This laser 46 should be pulsed as briefly as possible in the order of magnitude of less than 10 ps so that the highest possible output density per pulse is given and the highest possible efficiency is achieved on the basis of nonlinear mixing in the crystal 94.

The combination of embodiment examples of FIG. 5 and FIG. 6 are especially well suited for an apparatus for operating a video device according to FIG. 1, since not only is a minimum quantity of crystals required for generating the three light bundles, but also only a minimum quantity of optical elements can be used for beam guidance.

Table 1 which contains a list of various materials which can be used for the corresponding crystals is appended for the embodiment examples according to FIG. 3 to FIG. 6. The first column in Table 1 lists the nonlinear optical elements that are used in each case, wherein the reference numbers and Figures relating to the corresponding optical crystal are indicated in some cases. The second column lists the respective wavelength conversions. All of the conversions indicated therein relate to a realization of the red light bundle and blue light bundle for video projection in which a Nd:YVO$_4$ solid-state laser with a wavelength of 1064.3 nm is used as laser 46. The next column shows the wavelength of the red light bundle or blue light bundle. A further column indicates possible nonlinear optical crystals. The nonlinear crystals were designated by the following abbreviations commonly employed in the state of the art:

| | | | | |
|---|---|---|---|---|
| LBO | = | LiB$_3$O$_5$ | = | Lithium Triborate |
| | = | KNbO$_3$ | = | Potassium Niobate |
| | = | LiNbO$_3$ | = | Lithium Niobate |
| Banana | = | Ba$_2$NaNb$_5$O$_5$ | = | Barium Sodium Niobate |
| BBO | = | beta-BaB$_2$O$_4$ | = | beta-Barium Borate |
| KTA | = | KTiOAsO$_4$ | = | Potassium Titanyl Arsenate |
| KTP | = | KTiOPO$_4$ | = | Potassium Titanyl Phosphate |
| RTP | = | RbTiOPO$_4$ | = | Rubidium Titanyl Phosphate |
| RTA | = | RbTiOAsO$_4$ | = | Rubidium Titanyl Arsenate |
| CTA | = | CsTiOAsO$_4$ | = | Cesium Titanyl Arsenate |

The next columns show the physical parameters of the crystals for the desired wavelengths, wherein the angle to the propagation direction of the exciting laser light relative to the crystal axis or crystal axes is entered in the column headed "Angle". The column under "Planes" gives the principal plane of the biaxial optical two-axis nonlinear crystals, and the Roman numerals I and II identify the phase matching type, as is conventional. The ordinary wave is designated by "o" and the extraordinary wave by "e".

"Temp." designates the temperature in degrees Centigrade at which there is phase matching. The designation "RT" in the Table indicates that the nonlinear conversion can be carried out at room temperature.

The abbreviation "FOM" refers to "Figure of Merit". This variable is a measurement of the intensity of the nonlinear interaction. It is defined as:

$$d_{eff}^2/(n^1 n^2 n^3),$$

wherein $d_{eff}$ is the effective nonlinear coefficient of the crystal and $n_1$, $n_2$ and $n_3$ are the refractive indices of the waves in question.

The angle indicated in the following column is the walk-off angle. This refers to the angle of the energy flow of the newly forming wave or waves to the generated beam direction.

The following three columns list the acceptance widths for the respective nonlinear process with respect to wavelength, angle and temperature. The dependencies of the acceptances on the length L of the crystal are eliminated by multiplication.

The Tables in connection with the Figures clearly show the multiplicity of possibilities for realizing the invention. The laser beams which are generated are used for the color display of video pictures with sufficient output for a high white luminous density. The total output of the laser source that must be supplied in these alternatives for acceptable laser outputs for displaying color video pictures is less than 30 W, that is, always within a range which permits the construction of a video system without extreme expenditure on cooling means and regulation.

The use of the radiation of the fundamental wave and the signal wave, both of which lie in the near infrared range with wavelengths of less than 2000 nm, for generating red, green and blue enables the use of common (standard) components, since they need not be transparent in the range of the longer-wave idler beams. In particular, the near infrared wavelength that is used allows a greater selection of nonlinear optical crystals in the process and apparatus described herein, since they need only be transparent in the near infrared region for generating red, green and blue. In addition to the energy conservation in the frequency conversion processes, the pulse conservation (phase matching) must be selected for efficient generation of the new waves. As is shown in Table 1, suitable crystals which possess the appropriate physical characteristics can be selected for the process and apparatus.

In particular, the process and the apparatus also allow the use of nonlinear optical crystals of the borate family, for example: beta-barium borate (BBO) and lithium triborate (LBO). Since these crystals are UV-transparent to a sufficient degree, they do not present problems in the generation of the blue light bundle, since they absorb practically no light of its wavelength. Further, the borate crystals have very good mechanical, optical and nonlinear optical characteristics. The generation of the blue light bundle is accordingly also possible in the range of mean output power greater than one watt.

With a KTA crystal for the OPO and for the sum frequency mixer 70 and with a LBO crystal for the sum frequency mixer 86 according to the embodiment example of FIG. 5, a maximum output of 9 W is achieved for generating white at a laser input power of 29 W and a wavelength of 1064.3 nm. In particular, it was possible to achieve an output for the blue light bundle of up to 4 W. It was not previously possible to realize such high outputs with diode lasers.

A system for generating three light bundles such as that shown in detail in the preceding description comprises only a few function-determining elements which, in addition, when the frequency conversion processes described herein are used, bring about a simple construction with few components which requires little space and has a low electrical input power. The function-determining elements are the infrared laser system 46, the OPO 56 and the device 62, especially with elements 70, 76, 80, 86 or 88.

While the foregoing description and drawings represent the present invention, it will be obvious to those skilled in the art that various changes may be made therein without departing from the true spirit and scope of the present invention.

TABLE I

| Nonlinear element | $\lambda$ [nm] | $\lambda$ Red or Blue [nm] | Crystal | Angle [°] | Plane | Temp. [°C.] | FOM [(pm/V)$^2$] | $\rho$ [°] | $\Delta\lambda \cdot L$ [nm · cm] | $\Delta\theta \cdot L$ [° · cm] | $\Delta T \cdot L$ [°C. · cm] |
|---|---|---|---|---|---|---|---|---|---|---|---|
| Crystal 94 | | | | | | | | | | | |
| " | 1064→532 | | LBO | 0 | xy I (oo-e) | 136.1 | 0.17 | 0 | 3.7 | | 4.9 |
| " | 1064→532 | | KNbO$_3$ | 0 | xz I (oo-e) | 157.4 | 14.9 | 0 | 0.25 | | 0.3 |
| " | 1064→532 | | LiNbO$_3$ | 90 | I (oo-e) | 132.3 | 2.6 | 0 | 0.3 | | 0.9 |
| " | 1064→532 | | Banana | 0 | xy I (ee-o) | 107.8 | 22.3 | 0 | 0.3 | | 0.6 |
| OPO 56 | | | | | | | | | | | |
| " | 1534 ± 3474 | 628/461 | KTA | 0 | xy II (e-eo) | RT | 3.1 | 0 | 2.0 (S)/10.0 (I) | 9.6 | — |
| " | 1571 ± 3297 | 634/458 | KTP | 0 | xy II (e-eo) | RT | 3.6 | 0 | 2.0 (S)/8.6 (I) | 7.4 | — |
| " | 1604 ± 3160 | 640/455 | RTP | 90 | xy II (e-eo) | RT | 2.0 | 0 | 1.9 (S)/7.4 (I) | 6.7 | — |
| " | 1690 ± 2872 | 653/449 | RTP | 0 | xy II (e-eo) | RT | 3.0 | 0 | 2.5 (S)/7.3 (I) | 6.3 | — |
| " | 1590 ± 3216 | 638/457 | RTA | 90 | xy II (e-eo) | RT | 0.9 | 0 | 2.3 (S)/9.2 (I) | 10.3 | — |
| " | 1628 ± 3071 | 643/453 | RTA | 0 | xy II (e-eo) | RT | 2.4 | 0 | 2.5 (S)/8.9 (I) | 10.2 | — |
| " | 1545 ± 3420 | 630/460 | KNbO$_3$ | 41.8 | xz I (e-oo) | 40.0 | 8.9 | 3.6 | 16 (S)/16 (I) | 0.02 | 80 |
| SFM 70 | | | | | | | | | | | |
| " | 1064 ± 1534 | 628 | KTA | 23.6 | xy II (eo-e) | RT | 2.6 | 0.13 | 1.2/15.7 | 0.8 | — |
| " | " | " | KTP | 76.2 | xz II (oe-o) | RT | 3.2 | 1.35 | 1.4/28.3 | 0.09 | — |
| " | " | " | RTP | 32.7 | xy II (eo-e) | RT | 2.6 | 0.32 | 1.3/62.7 | 0.32 | — |
| " | " | " | LBO | 0 | xy I (oo-e) | 8.6 | 0.17 | 0 | 26/>100 | | 5.6 |
| " | " | " | LBO | 87 | xz I (ee-o) | 20.0 | 0.17 | ~0.1 | 25/>100 | 0.35 | 5.6 |
| " | " | " | KNbO$_3$ | 31.3 | xz I (oo-e) | 38.1 | 11.1 | ~3.5 | 0.5/0.74 | 0.012 | 1.6 |
| SFM 86/FIG. 4 | | | | | | | | | | | |
| " | 767 ± 1064 | 446 | KNbO$_3$ | 90 | xy I (oo-e) | 105.3 | 10.9 | 0 | 0.1/0.13 | | 0.16 |
| " | " | " | KNbO$_3$ | 48.9 | yz I (ee-o) | RT | 10.1 | 1.1 | 0.19/0.27 | 0.06 | 0.3 |
| " | " | " | LBO | 22.3 | xy I (oo-e) | 40.0 | 0.15 | 0.75 | 2.3/3.3 | 0.05 | 5.3 |
| " | " | " | LBO | 23.5 | yz II (eo-o) | RT | 0.25 | 0.39 | 8.3/2.2 | 0.36 | 6.5 |
| " | " | " | BBO | 26.0 | I (oo-e) | RT | 0.95 | 3.6 | 1.4/2.0 | 0.011 | — |
| SHG 88 | | | | | | | | | | | |
| " | 1534→767 | | LBO | 0 | xy I (oo-e) | 77.4 | 0.17 | 0 | >100 | | 6.5 |
| " | 1534→767 | | KNbO$_3$ | 38.2 | xz I (oo-e) | 40.0 | 10.5 | 3.7 | 1.6 | 0.014 | |
| " | 1534→767 | | KNbO$_3$ | 23.1 | xy I (oo-e) | 40.0 | 2.1 | 2.1 | 1.7 | 0.02 | |
| " | 1534→767 | | KTP | 54.0 | xz II (oe-o) | RT | 2.1 | 2.7 | 4.8 | 0.05 | |
| " | 1534→767 | | CTA | 10.1 | xy II (eo-e) | RT | 1.7 | 0.16 | 4.0 | 0.74 | |
| SFM 86/FIG. 5 | | | | | | | | | | | |
| " | 628.5 ± 1535 | 446 | KTP | 69.2 | xz II (eo-o) | RT | 2.8 | 2.2 | 0.5/0.8 | 0.046 | — |
| " | " | " | RTP | 79.6 | xz II (eo-o) | RT | 2.6 | 1.15 | 0.45/0.74 | 0.086 | — |
| " | " | " | KTA | 75.9 | xz II (eo-o) | RT | 2.6 | 1.5 | 0.5/0.7 | 0.063 | — |
| " | " | " | RTA | 40.0 | xy II (oe-e) | RT | 1.55 | 0.39 | 0.6/0.75 | 0.212 | — |

TABLE I-continued

| Nonlinear element | λ [nm] | λ Red or Blue [nm] | Crystal | Angle [°] | Plane | Temp. [° C.] | FOM [(pm/V)²] | ρ [°] | Δλ · L [nm · cm] | Δθ · L [° · cm] | ΔT · L [° C. · cm] |
|---|---|---|---|---|---|---|---|---|---|---|---|
| " | " | " | LBO | 18.2 | xy II (oo-e) | RT | 0.3 | 0.6 | 2.4/7.1 | 0.129 | 5.0 |
| " | " | " | BBO | 24.4 | I (oo-e) | RT | 0.98 | 3.4 | 1.4/3.75 | 0.023 | — |

What is claimed is:

1. A process for generating at least a red, a green and a blue light bundle, especially for displaying color images, which red and blue light bundles are obtained in the process with an optical parametric oscillator (OPO) and further nonlinear optical component elements, comprising the steps of:

generating said green light bundle by frequency multiplication from a primary light bundle or from a portion thereof, said primary light bundle having a wavelength lying in the near infrared range and being less than 2000 nm;

separating at least a partial light bundle from the primary light bundle for exciting the OPO for generating a signal beam and an idler beam;

obtaining the red light bundle from one of the further nonlinear optical component elements by frequency mixing said signal beam with another partial light bundle of the primary light bundle; and obtaining the blue light bundle from another of the further nonlinear optical component elements by frequency mixing a partial light bundle of the red light bundle with the signal beam or with a frequency doubled idler beam.

2. The process according to claim 1, wherein the primary light bundle is conducted through a nonlinear optical crystal for frequency multiplication, wherein a light bundle with the frequency of the primary light bundle for exciting the OPO, and the green light bundle with a doubled frequency for image generation, are taken from this crystal.

3. Apparatus for generating at least a red, a green and a blue light bundle, especially for displaying color images, said red light bundle having a longest wavelength and said blue light bundle having a shortest wavelength, comprising: a laser for generating a primary light bundle comprising wavelength lying in the near infrared range and being less than 2000 nm;

an OPO from which at least one of a signal beam and an idler beam can be taken after excitation by means of a partial light bundle of the primary light bundle;

a nonlinear optical crystal in which another partial light bundle of the primary light bundle or the primary light bundle itself enters, and wherein the light occurring as a result of the nonlinear optical behavior of this crystal is introduced into a wavelength-selective filter by which the green light bundle for color image display is filtered out;

a device having nonlinear optical elements;

wherein a further light bundle and at least one of the idler beam and the signal beam are introduced into this device; and wherein the red light bundle and the blue light bundle can be coupled out of this device;

the further light bundle being a partial light bundle of the primary light bundle; the red light bundle can be generated in the device having nonlinear optical elements exclusively from the further light bundle and the signal beam by frequency mixing; and the blue light bundle can be generated in the device having nonlinear optical elements exclusively from a partial light bundle of the red light bundle and either the signal beam or a frequency doubled idler beam by frequency mixing.

4. The apparatus according to claim 3 wherein there is provided a nonlinear optical crystal in which another partial light bundle of the primary light bundle or the primary light bundle itself enters, and wherein the light occurring as a result of the nonlinear optical behavior of this crystal is introduced into a wavelength-selective filter by which a light bundle for color image display other than one of the blue or red light bundles is filtered out.

5. The apparatus according to claim 3, wherein another light bundle is taken from the nonlinear optical crystal by means of the filter or another filter, which light bundle is introduced into at least one of the device having the non-linear optical elements as the further light bundle for generating the red light bundle and the OPO as the partial light bundle for exciting the OPO.

6. The apparatus according to claim 3, wherein the OPO has a crystal by which an infrared idler beam can be generated, and wherein exclusively the signal beam of the OPO and a partial light bundle of the primary light bundle are introduced into the device having the nonlinear optical elements.

7. The apparatus according to claim 3, wherein the laser emits light with a wavelength of between 1020 nm and 1080 nm.

8. The apparatus according to claim 3, wherein a first sum frequency mixer is provided within the device having non-linear optical elements, a partial light bundle of the signal beam of the OPO and the further light bundle of the primary light bundle being introduced into this sum frequency mixer, and the red light bundle is taken from this sum frequency mixer.

9. The apparatus according to claim 8, wherein a second sum frequency mixer is provided in the device having nonlinear optical elements, the partial light bundle of the red light bundle and either another partial light bundle obtained from the signal light beam or a frequency doubled idler beam being introduced into this second sum frequency mixer, and the blue light bundle can be taken from the output side of this second sum frequency mixer.

10. The apparatus according to claim 9, wherein a partial slight bundle of the signal beam is introduced into the second sum frequency mixer.

11. The apparatus according to claim 9, wherein a frequency doubler into which at least one partial light bundle of the idler beam enters, and the frequency-doubled light bundle obtained by means of the frequency doubler is introduced into the second sum frequency mixer.

12. The apparatus according to claim 3, wherein, when splitting into partial light bundles, the respective proportion factor is determined for a maximum output for displaying white light when mixing the at least red, green and blue light bundles for displaying color images.

* * * * *